R. F. KINSLEY.
MATERIAL FOR REINFORCING RUBBER ARTICLES AND METHOD OF MAKING THE SAME.
APPLICATION FILED MAY 19, 1919.
1,343,368.
Patented June 15, 1920.
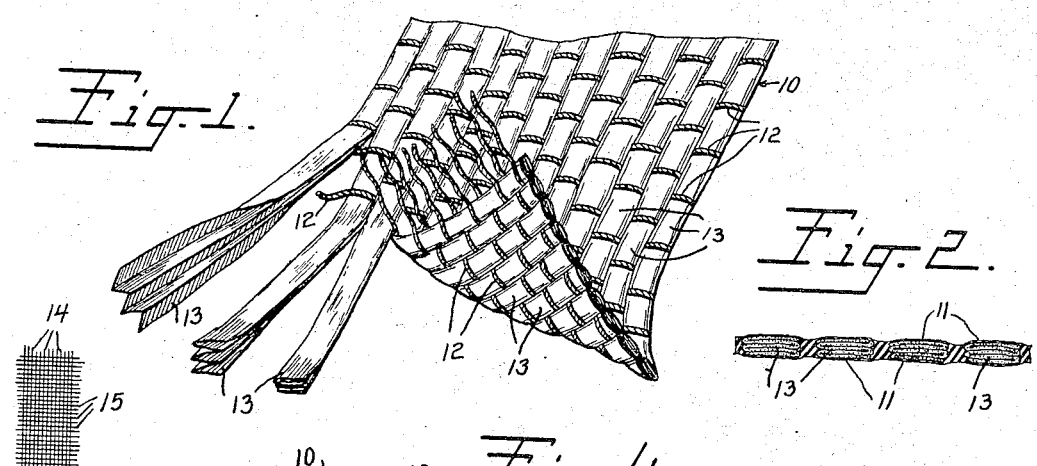
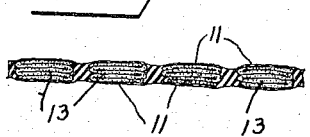
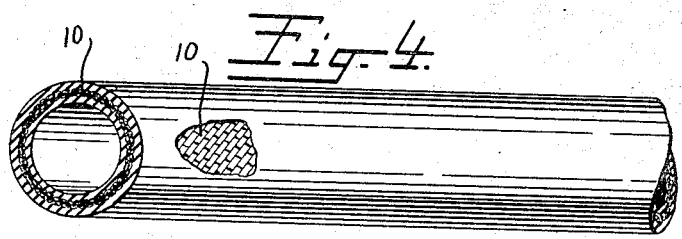
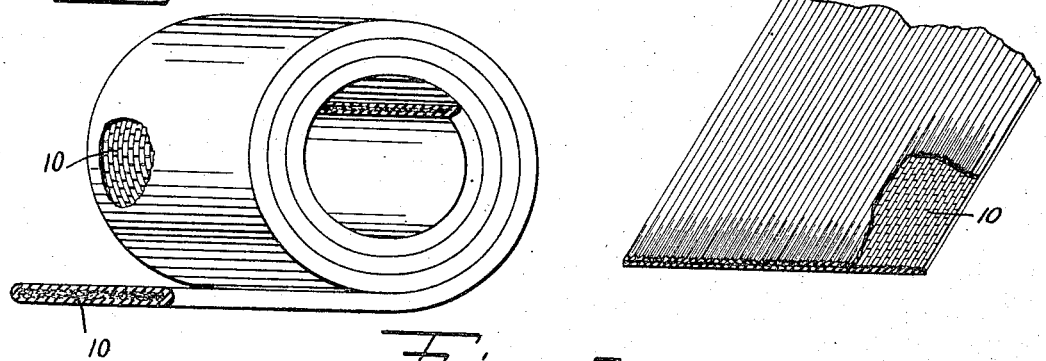
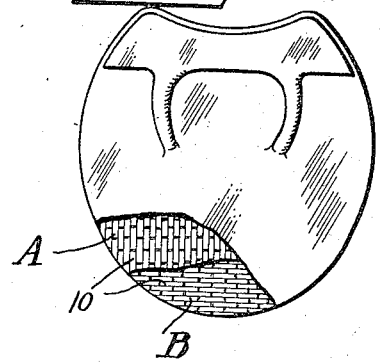
Inventor.
R. F. Kinsley,
By his Attorney.
Ernest Hopkinson

UNITED STATES PATENT OFFICE.

RICHARD F. KINSLEY, OF EAST CLEVELAND, OHIO, ASSIGNOR TO THE MECHANICAL RUBBER COMPANY, A CORPORATION OF NEW JERSEY.

MATERIAL FOR REINFORCING RUBBER ARTICLES AND METHOD OF MAKING THE SAME.

1,343,368.

Specification of Letters Patent.

Patented June 15, 1920.

Application filed May 19, 1919. Serial No. 298,297.

*To all whom it may concern:*

Be it known that I, RICHARD F. KINSLEY, a citizen of the United States, residing in East Cleveland, county of Cuyahoga, State of Ohio, have invented certain new and useful Improvements in Material for Reinforcing Rubber Articles and Methods of Making the Same, of which the following is a full, clear, and exact description.

This invention relates to a reinforcing material for use in the manufacture of rubber articles, and to methods of manufacturing the same.

In the production of certain rubber articles, for example, horseshoe pads, floor coverings, belting, hose, tires, etc., one or more sheets or strips of fabric have been used to reinforce or strengthen the structure. It is highly important where the articles are subjected to a great amount of flexing that the reinforcing material possess great strength and the maximum amount of flexibility. Heretofore the warp and weft threads of such materials have usually consisted of twisted strands of cotton fiber, the compactness of which, due to the twist has rendered the material relatively stiff and unpliable. This disadvantage has been particularly marked where thick material has been employed to reinforce and give body to the finished article. With a view to increasing the flexibility of the material it has been suggested to use loosely twisted strands, but it has been found that such strands do not possess sufficient transverse strength to prevent their being torn apart by the lateral stresses encountered in service, and the consequent separation of the material from the mass of rubber to which it is united in the finished article.

An object of the present invention accordingly is to provide an improved reinforcing material possessing great flexibility and strength and adapted to form a strong, vulcanized union with the rubber mass of the article it serves to reinforce.

A further object of the invention is to provide a process for manufacturing the material.

Other objects of the invention will hereinafter readily appear.

In the drawings:

Figure 1 is a perspective view of a piece of the improved reinforcing material, portions being broken away and laid back to show certain details of the construction.

Fig. 2 is an enlarged edge view taken in the direction of the weft, of the material illustrated in Fig. 1.

Fig. 3 is an enlarged fragmentary view of one of the weft strands.

Figs. 4, 5, 6 and 7 are perspective views, with portions broken away, showing respectively, a hose, a floor mat, a belt, and a horseshoe pad, reinforced with the improved material.

The material illustrated in the drawings embodies a fabric base 10 thoroughly coated or impregnated with rubber 11. The base 10 is composed of twisted warp strands 12, interwoven with longitudinally plaited weft strands 13, formed of narrow strips cut from a sheet of woven fabric in the direction of the warp thereof and folded longitudinally in any suitable manner during the fabrication of the base. The rubber coating 11 is preferably frictioned on to the base, but may be applied thereto in any other suitable manner. It is particularly desirable to have the rubber thoroughly penetrate the base and it has been found that this result is satisfactorily obtained by the friction method. The fabric base is adapted to resist relatively great stresses in the direction of its weft and the rubber coating enables a strong permanent vulcanized union to be formed between it and a superposed mass of rubber.

By referring to Fig. 3 of the drawings, it will be seen that each weft strand 13 consists of a plurality of parallel, longitudinally extending threads 14, which impart great strength to the base in the direction of its weft, and a number of short parallel binder threads 15 interwoven at right angles with the longitudinal threads 14. The binder threads 15 give great transverse strength to the weft strands, adapting the base to withstand stresses tending to separate it from the rubber mass of the article it serves to reinforce.

A satisfactory manner of weaving the base consists in passing the weft strands 13 between alternate warp strands 12. In order to obtain maximum flexibility, just a sufficient number and size of warp strands are preferably used to enable the base to resist relatively small longitudinal stresses. The absence of any twist in the weft strands and their plaited construction renders them highly flexible which desirable feature is preserved in the finished material by the method of weaving set forth.

Although the base has been described as having its weft strands formed of plaited strips of woven fabric, its construction may be varied by using plaited strands for the warp and twisted strands for the weft. In certain articles, for example, horseshoe pads, it is desirable to use a reinforcement possessing great strength in both the direction of its width and the direction of its length. For such purpose two or more plies of the improved reinforcing material may be superposed with the weft strands of one ply crossing the weft strands of the other at an angle. This form of construction is clearly illustrated in Fig. 6, wherein the woven weft strands 11 of the ply A are disposed at right angles to the woven weft strands of the ply B.

An important advantage of the improved material is its high degree of flexibility in proportion to its thickness. A further advantage is that it possesses sufficient strength in the direction of its thickness to efficiently resist stresses tending to separate it from the rubber mass of the article which it reinforces.

According to one method of manufacturing the improved material, a base is first prepared by arranging a plurality of twisted strands in parallelism in substantially the same plane and interweaving therewith substantially flat untwisted strands of woven fabric. As each of the untwisted strands is woven into the base it is crimped transversely into a series of plaits. The base so formed is then thoroughly coated or impregnated with rubber by passing it through friction calenders. It is to be understood however that any other suitable method may be employed to rubberize the base. The improved material may be used to reinforce any suitable rubber article. It has been found that when the material is vulcanized, the rubber coating yieldingly secures the strands in their pre-arranged relative positions.

While one of the preferred embodiments of the invention has been fully described it is to be understood that various changes in form, arrangement and material may be resorted to without sacrificing any of the advantages or departing from the spirit and scope of the invention defined in the appended claims.

Having thus described my invention, what I desire to protect by Letters Patent is:

1. A rubber article including a reinforcing ply of interwoven flat and round strands embedded therein and bound together by vulcanization.

2. A rubber article including a reinforcing ply of interlaced woven fabric and corded strands embedded therein and bound together by vulcanization.

3. A rubber article including a reinforcing ply of interlaced woven fabric and corded strands embedded therein and bound together by vulcanization, said woven fabric strands being substantially parallel.

4. A rubber article including a reinforcing ply of interlaced woven fabric and corded strands embedded therein and bound together by vulcanization, said woven fabric strands being each composed of superimposed layers of fabric.

5. A rubber article including a reinforcing ply of interlaced woven fabric and corded strands embedded therein and bound together by vulcanization, said woven fabric strands being plaited.

6. A rubber article including a plurality of superimposed plies of reinforcing material each ply consisting of interlaced flat and round strands embedded in the rubber and vulcanized, the flat strands in contiguous plies being disposed crosswise of each other.

7. A rubber article including a plurality of superimposed plies of reinforcing material each ply consisting of interlaced woven fabric and corded strands embedded in the rubber and bound together by vulcanization, the woven fabric strands being arranged substantially parallel and those in one ply being transverse those in a superimposed ply.

8. A method of making material of the class described, which comprises first preparing a base consisting of untwisted plaited strands of woven material interwoven with twisted fiber cross strands, rubberizing the base so formed and vulcanizing the material.

9. A method of making material of the class described, which comprises arranging a plurality of twisted strands in parallelism in substantially the same plane, interweaving therewith substantially flat strands of woven fabric, crimping each of the flat strands transversely into a series of plaits as it is woven into place, rubberizing the base so formed and vulcanizing the material.

10. A method of making material of the class described which comprises forming flat strips of a plurality of parallel threads or cords extending longitudinally of the strip and bound together by transverse threads or cords to render them manipulable, bunching the respective strips transversely to materially increase the thickness with a corresponding decrease in the width, binding the strips so formed and arranged in parallelism in a flat sheet with cross threads or cords interwoven therewith, applying rubber to the sheet thus formed, and setting the rubber in intimate contact therewith by vulcanization.

Signed at Cleveland, Ohio, this 14th day of May, 1919.

RICHARD F. KINSLEY.